(12) United States Patent
Luo et al.

(10) Patent No.: US 10,334,091 B2
(45) Date of Patent: Jun. 25, 2019

(54) BORDERLESS ULTRA-THIN SLIDE PHONE AND METHOD FOR USING THE SAME

(71) Applicant: SHENZHEN HUARUIBO PHOTOELECTRIC CO., LTD., Shenzhen, Guangdong (CN)

(72) Inventors: Xinhua Luo, Shenzhen (CN); Qi Wang, Shenzhen (CN)

(73) Assignee: SHENZHEN HUARUIBO PHOTOELECTRIC CO., LTD., Shenzhen (CN)

( * ) Notice: Subject to any disclaimer, the term of this patent is extended or adjusted under 35 U.S.C. 154(b) by 0 days.

(21) Appl. No.: 15/743,554

(22) PCT Filed: Mar. 23, 2016

(86) PCT No.: PCT/CN2016/077058
§ 371 (c)(1),
(2) Date: Jan. 10, 2018

(87) PCT Pub. No.: WO2017/008525
PCT Pub. Date: Jan. 19, 2017

(65) Prior Publication Data
US 2018/0205809 A1   Jul. 19, 2018

(30) Foreign Application Priority Data

Jul. 10, 2015 (CN) .......................... 2015 1 0404375

(51) Int. Cl.
*H04M 1/02* (2006.01)
(52) U.S. Cl.
CPC ....... *H04M 1/0245* (2013.01); *H04M 1/0237* (2013.01); *H04M 1/0266* (2013.01); *H04M 2250/52* (2013.01)

(58) Field of Classification Search
CPC ............ H04M 1/0245; H04M 1/0237; H04M 1/0266; H04M 2250/52
See application file for complete search history.

(56) References Cited

U.S. PATENT DOCUMENTS

2007/0254691 A1* 11/2007 Lu ...................... H04M 1/0237
455/550.1
2009/0036178 A1* 2/2009 Kim .................... H04M 1/0235
455/575.4
(Continued)

FOREIGN PATENT DOCUMENTS

CN 201066864 Y 5/2008
CN 201499194 U 6/2010
(Continued)

*Primary Examiner* — Nguyen T Vo
(74) *Attorney, Agent, or Firm* — Loza & Loza, LLP; Michael F. Fedrick

(57) ABSTRACT

A borderless ultra-thin slide phone and a method for using the same. The mobile phone includes a display assembly 1000 and a bottom shell assembly 2000, among which the display assembly 1000 includes a cover lens 1100, a display screen 1200, and a screen middle frame 1300 that is provided with a support step 1400. The display screen 1200 is arranged on the support step 1400. The bottom shell assembly 2000 includes a bottom shell 2100, a battery, and a mainboard component. A sliding structure is defined between the screen middle frame 1300 and the bottom shell 2100, the bottom shell 2100 is provided with an answering component and a control component. The mainboard component is electrically connected with the display screen 1200 via a ribbon cable. The method includes sliding the display screen upwards and downwards.

20 Claims, 10 Drawing Sheets

(56) References Cited

U.S. PATENT DOCUMENTS

2011/0105191 A1* 5/2011 Yamagiwa .......... H04M 1/0239
455/566
2011/0308852 A1* 12/2011 Kobayashi .......... H04M 1/0237
174/560

FOREIGN PATENT DOCUMENTS

| CN | 202004811 U | 10/2011 |
|----|-------------|---------|
| CN | 202979057 U | 6/2013 |
| CN | 203181024 U | 9/2013 |
| CN | 203313225 U | 11/2013 |
| CN | 104618542 A | 5/2015 |
| CN | 104994190 A | 10/2015 |
| CN | 204906442 U | 12/2015 |
| EP | 2348379 A1 | 7/2011 |
| WO | 2008120706 A1 | 10/2008 |

* cited by examiner

BORDERLESS ULTRA-THIN SLIDE PHONE AND METHOD FOR USING THE SAME

CROSS-REFERENCE TO RELATED APPLICATIONS

This application is the U.S. national stage of International Patent Application No. PCT/CN2016/077058, filed on Mar. 23, 2016, which claims the benefit of priority under 35 U.S.C. § 119 from Chinese Patent Application No. 201510404375.9, filed on Jul. 10, 2015. The disclosure of the foregoing applications are incorporated herein by reference in their entirety.

TECHNICAL FIELD

The invention relates to the field of mobile communication terminal, in particular to a borderless ultra-thin slide phone and method for using the same.

BACKGROUND

With the popularization of 4G technology, smart phones with ultra-thin body and ultra-narrow border screen become the mainstream of electronic products consumption. Facing with a wide variety of products, consumers tend to choose the most special and featured products.

At present, there are some mobile phone manufacturers continue to launch a kind of mobile phone with narrower border in two sides, even more factories have promoted another kind of phone without borders in three sides. However, for users who has been accustomed to using the front facing camera and video chat. It is no longer convenient to use without front camera or invert the mobile phone; There are some other cases like setting the receiver at the top of the mobile phone or taking out front camera with a holder, whereas these do not meet the people's habits, but also undermine the harmony and beauty of the overall mobile phone, lacking of practical possibility and promotion.

SUMMARY

The aim of the invention is to overcome the shortcomings of the existing technology, providing a borderless ultra-thin slide mobile phone, four sides without border, users can slide the display screen. As its features in easy operation, enhancing the overall beauty, improving the convenience, and maintaining the traditional using habits. Thus it can be widely promoted and produced.

The technical solution of the present invention is as follows: a borderless ultra-thin slide mobile phone comprises a display assembly and a bottom shell assembly that are stacked together; wherein the display assembly comprises a cover lens, a display screen and a screen middle frame; the middle frame is provided thereon with a supporting step; the display screen is arranged on the supporting step; the bottom shell assembly comprises a bottom shell, a battery and a mainboard, where the battery and the mainboard are arranged in the bottom shell; the sliding structure is arranged between the screen middle frame and the bottom shell; a call receiving assembly and a control assembly that are electrically connected with the mainboard are arranged at an upper end and a lower end of the bottom shell; the mainboard is connected with the display screen by electrically conductive pieces.

Specifically, the call receiving assembly comprises a front camera, a receiver, and a proximity sensor set on the upper end of the bottom shell.

Specifically, the supporting step is arranged around edges of the screen middle frame.

Specifically, the supporting step is arranged at edges of two opposite sides of the screen middle frame.

Specifically, an adhesion layer is arranged between the supporting step and the display screen; and the cover lens covers on a periphery of the screen middle frame and is adhered to the screen middle frame.

Specifically, a backlight module lies between the display screen and the bottom of the middle screen frame.

Specifically, the backlight module comprise an iron frame, a backlight membrane, and a light guide plate; the light guide plate and the backlight membrane material are respectively arranged inside the iron frame; a top surface of the iron frame and the backlight membrane are covered with shading layer and the frame is bent to strengthen the edge.

Further, side edges of the iron frame are provided with the reflecting layer.

Specifically, the bottom of the screen middle frame is provided with a hollow slot for accommodating the electrically conductive pieces and a hollow hole for leading the electrically conductive pieces out to piercing through the mainboard.

Specifically, the sliding structure comprises a slide rail set on two opposite sides of a back of the screen middle frame and a sliding chute correspondingly arranged on two opposite sides of a front of the bottom shell; and the slide rail are slidably arranged in the sliding chute.

Furthermore, the sliding chute is provided therein with a rubber pad.

Furthermore, the sliding structure also comprises a positioning assembly configured to indicate a position of the display assembly; the positioning assembly comprises three positioning grooves arranged on the slide rail and a pulley assembly for sliding; the pulley components comprises: a pulley rod, a pulley, and a pulley rod fixing shell; the pulley is slidably arranged at one end of the pulley rod, the pulley rod is arranged inside the pulley rod fixing shell, a spring is set between the other end of the pulley rod and a side wall of the pulley rod fixing shell; and the pulley rod is slidably limited inside the positioning groove.

Specifically, a lateral side of the pulley rod fixing shell is bent to form a clipping edge, the bottom shell is provided with a fixing groove, and the clipping edge is fixed in the fixing groove.

Specifically, an end of the other end of the pulley rod are provided with two spring rods; the two springs are inserted in the spring rods; a spring lock plate is arranged on the pulley rod fixing shell and the spring lock plate is locked between the two springs.

Furthermore, the pulley rod fixing shell is also provided with a pulley rod lock plate; a keyhole is arranged on the pulley rod, in which the pulley rod lock plate is stuck in the keyhole.

Specifically, the bottom shell comprises a main shell and a sub shell, a connection structure is arranged between the main shell and the sub shell, and the two sliding grooves are oppositely arranged on two sides of the main shell.

The method of application of this slide phone is also provided as following. sliding the display assembly upwards and downwards; when a calling comes, the user can slide down the display assembly to answer; when it is in a dormant state, the user can slide down the display assembly then directly choose to dial or use the camera in an operation interface; when the user want to select mobile phone functions, sliding up the display assembly and then enter the main interface of mobile phone to do control function selection.

The description of this borderless ultra-thin slide phone is offered as well as its application. with the display assembly and the bottom shell assembly superposed and call receiving assembly and control assembly arranged in the bottom shell of the upper and lower ends, the display assembly can block answer component and control components, showing no frame in display assembly and improving the overall aesthetics of the mobile phone. Moreover, since the sliding structure lies between the screen middle frame and the bottom shell, the display assembly can slide up and down and expose the call receiving assembly or control assembly as required, achieving the function of receiving or pressing buttons and improving the convenience of using. Meanwhile, by setting up the supporting step on the screen middle frame and the display screen on the supporting steps, which not only can stabilize the supporting the screen, but also realizes a borderless display screen, further improving the overall beauty of the mobile phone. It is a borderless ultra-thin slide phone that is beautiful and easy to operate thus having a good market prospect.

DETAILED DESCRIPTION OF THE EMBODIMENTS

Figure 1:
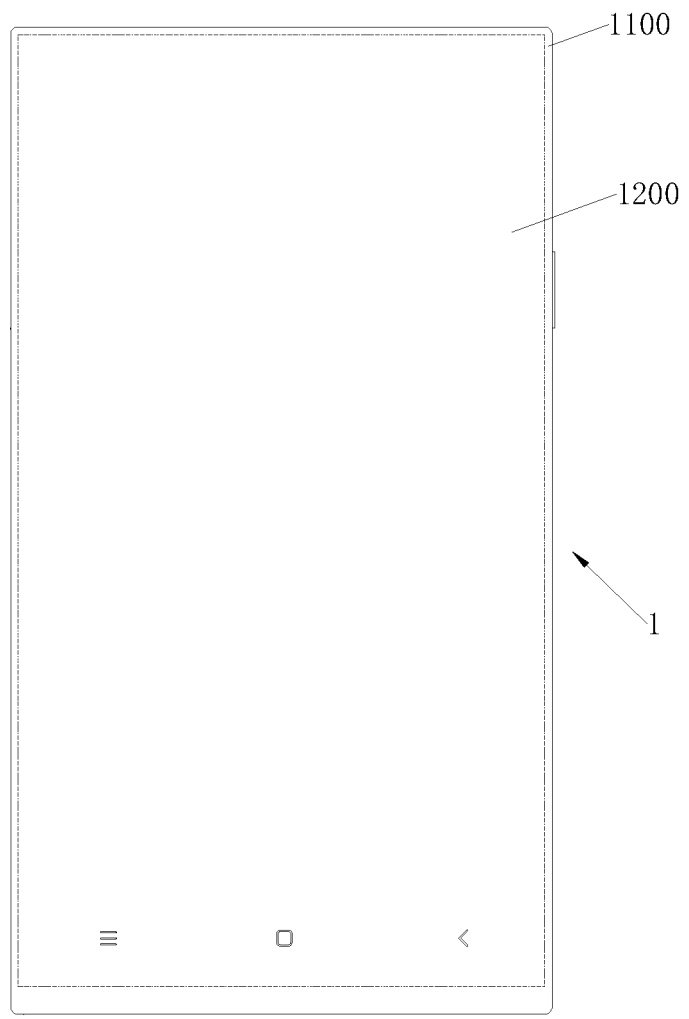
FIG. 1 is the front sketch map of the borderless ultra-thin slide phone of this invention.
Figure 2:
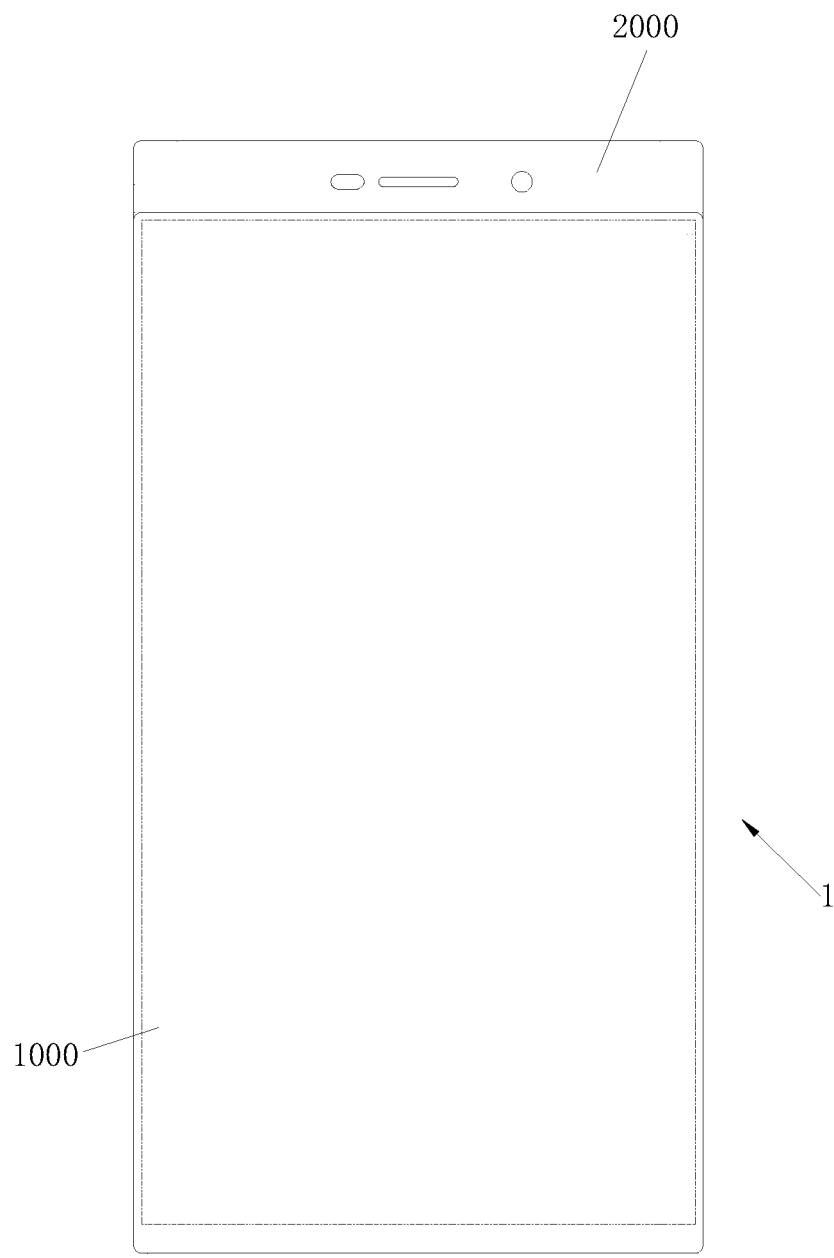
FIG. 2 is the front sketch map of the borderless ultra-thin slide phone when the slippery cover is slipped downwards.
Figure 3:
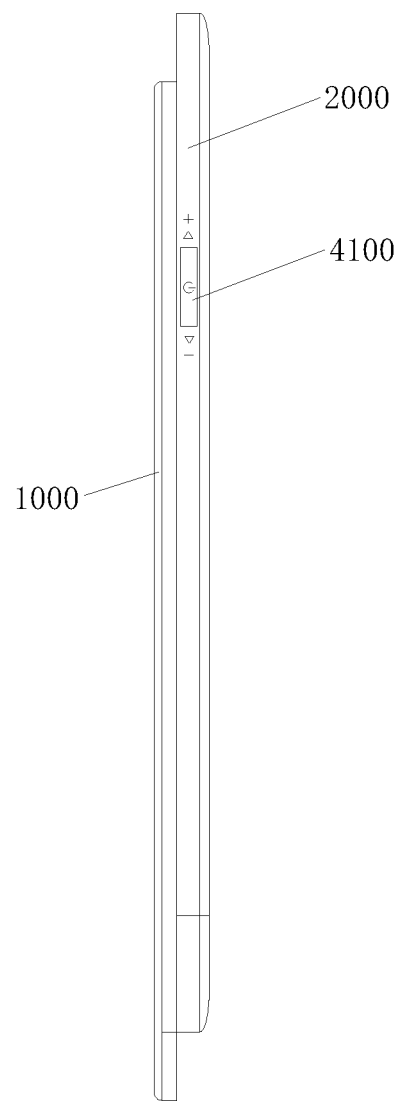
FIG. 3 is the side sketch map the borderless ultra-thin slide phone when the slippery cover is slipped downwards.
Figure 4:
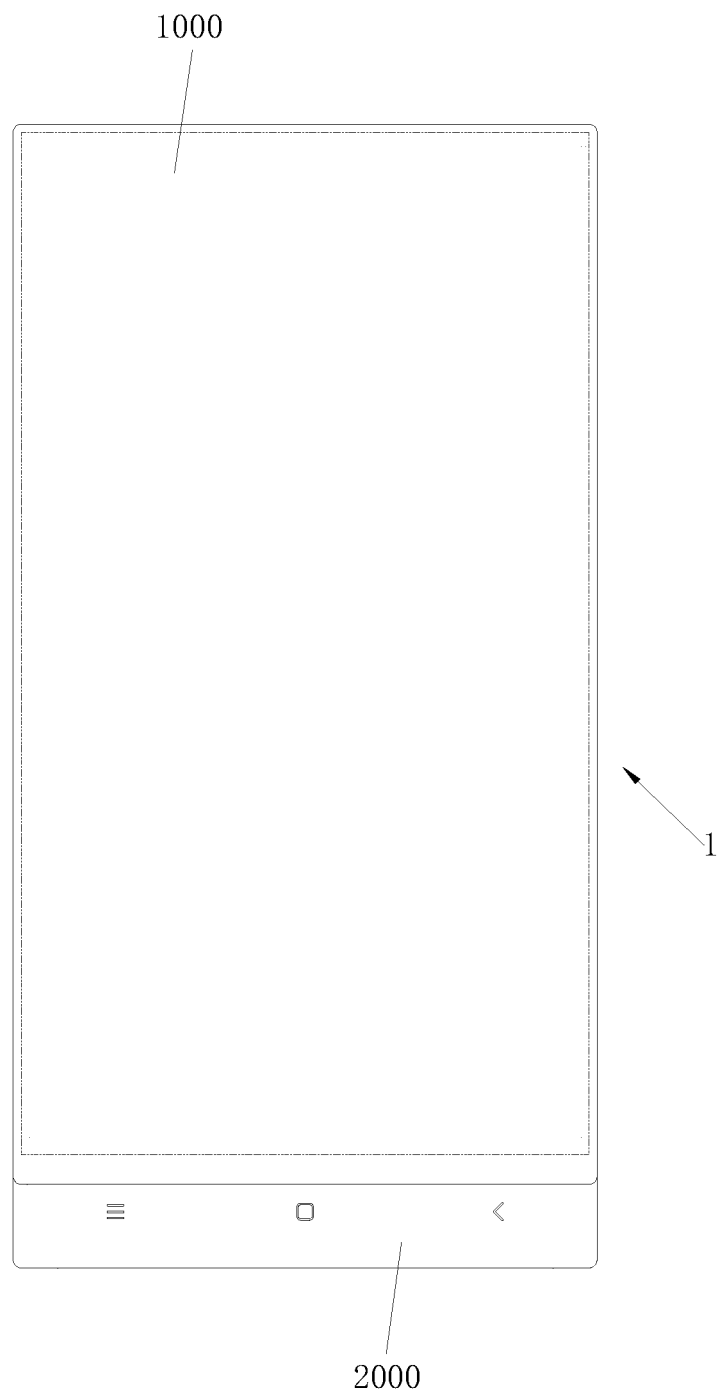
FIG. 4 is the front sketch map of the borderless ultra-thin slide phone when the slippery cover is slipped upwards.
Figure 5:
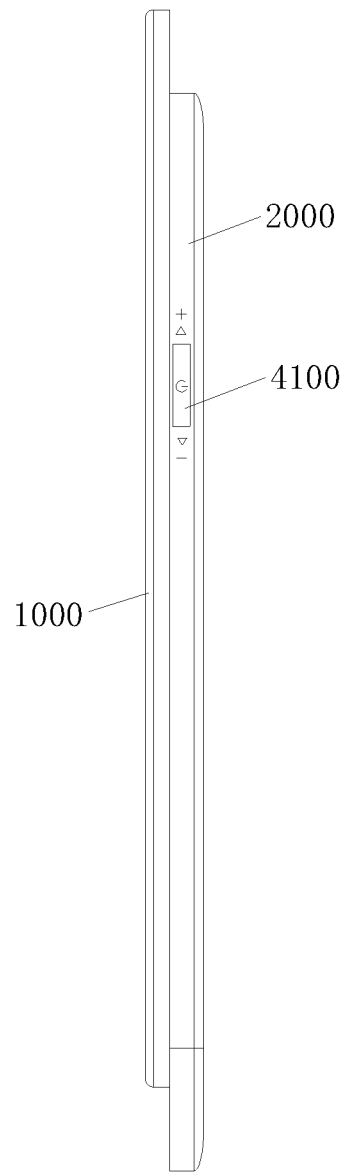
FIG. 5 is the side sketch map the borderless ultra-thin slide phone when the slippery cover is slipped upwards.

In order to make the goal, the technical scheme and the advantages of the invention more clear, the following is the further explanation in detail with the attached drawings and the examples of implementation. It should be understood that the specific case described here are only used to explain the invention but not to limit it.

As shown from FIGS. 1-4, this invention provides a borderless ultra-thin slide mobile phone which offers a solution of a phone without border in four sides that consistent with the public's daily habits. Moreover, this phone is provided with the front camera, receiver, proximity sensor and function selection at the end of the front page that are same to current smart phones. Based on this, it is furnished with a set of key operation scheme that is about how to answer the incoming calls, dial and use mobile phone with one hand.

As is shown from FIGS. 1-7, the borderless ultra-thin slider mobile phone contains the superposed display assembly 1000 and the bottom shell assembly 2000. The display assembly 1000 consists of a cover lens 1100, screen 1200 and middle frame of screen 1300. The four sides of the cover lens 1100 is arc edge so that a smooth transition of different structure can be make and the mobile phone can be kept streamlined in appearance. At the same time, and a cover lens 1100 curved surface have a refractive and divergent effect on the light of screen 1200. Therefore, with the visual effect, when looking at the phone, people will feel that the region of the cover lens 1100 black border around the display screen 1200 becomes narrower and esthetic.

Specifically, as is shown from FIGS. 2-7, in order to realize The borderless border of four sides of the mobile phone, a supporting step 1400 is provided on the screen middle frame 1300, the supporting step 1400 is formed by a CNC machining, and the display screen 1200 is disposed on the supporting step 1400, supported by the supporting step 1400 is fixed, so set, can reduce effectively the size of the border presented in the front of the phone, to make the phone without borders and the largest screen ratio. At the same time, the supporting step 1400 enhances the intensity of the side of the frame 1300 in the screen, effectively protecting the display screen 1200.

In this invention, as is shown from FIGS. 2-7, the bottom shell assembly 2000 contains bottom shell 2100 and a battery and a mainboard (not shown in pictures) in the bottom shell 2100. Sliding structure (not shown) is set between the screen middle frame 1300 and the bottom shell 2100. A call receiving assembly and a control assembly are arranged on the upper and lower ends of the bottom shell 2100 to connect with mainboard, the mainboard is connected with the display screen 1200 through a cable, the cable has good bendability, can withstand stretching or bending several times, ensure the reliability of the electrical connection between the mainboard-and the display screen 1200.

In this invention, providing a borderless ultra-thin slide mobile phone. the call receiving assembly contains a front camera, a receiver and a proximity sensor which are arranged on the front upper end of the bottom shell 2100, the control assembly comprises functional keys disposed at the lower front of the bottom shell 2100, of course, it is also possible to provide a virtual touch keyboard on the display screen 1200 to implement different control functions. meanwhile the phone is also same set on the phone with the other phone on market, the top surface of the bottom shell 2100 is provided with a SIM card slot and a headphone jack, the lower end of the bottom shell 2100 is provided with a microphone port, a USB jack and a breathing lamp, the back of the bottom shell 2100 is provided with a mobile phone rear camera, camera flash and speaker mesh. In this invention, providing a borderless ultra-thin slide mobile phone. The most commonly used part of the phone placed at the top, but not very common parts will be hidden. That is, only the display screen 1200 (with integrated touch function) is retained on the front of the phone, and the frame is truly borderless and beautiful. However, the front camera, the handset, the proximity sensor and the functional keys are all hidden and disposed under the display screen 1200 (all set inside in the bottom Shell 2100). When used, under the guiding of sliding structure, by driving the whole display assembly 1000 to slide up and down, the call receiving assembly or control assembly can be exposed to achieve the corresponding use function. Such as if the display assembly 1000 was slide down, the call receiving assembly can be seen and users can answer the call or take photos with the front camera by one hand only. It is of great convenience because it solved the problem that it is not easy to use existing touch screen mobile phones with only one hand as users have to use a finger to touch the phone and then slide to answer. When users who are not accustomed to virtual touch buttons want to browse web pages, edit files or short messages, are, by sliding the display assembly 1000 functional buttons will be exposed to users and then they can manipulate entity buttons, which improves the convenience of operation.

Moreover, as shown from FIGS. 2-5, on the side of the bottom shell 2100 is provided with an entity control key 4100 which is three-way operational. The key is the combination of switching on, off and adjusting the volume, which saves the occupied space of key layout and solves the problem that key not too scattered to operate with single hand. The invention adopts the three-in-one key, which defines the control key 4100 as following: "pressing downwards" means "switch on/off", "dialing upwards" is "volume+" or "page up", "dialing downwards" is "volume–" or "page down". It is convenient for working people who listen to music to adjust the volume or reading and surfing the Internet by one hand while another one holding the car. At the same time, the three-in-one key is made on the left upper side of the shell to help users to use the left thumb or the index finger of the right to press the key with one hand only. It can also put the three-in-one key in other place of the mobile phone according to the body size and different using habits of various countries people.

Figure 6:
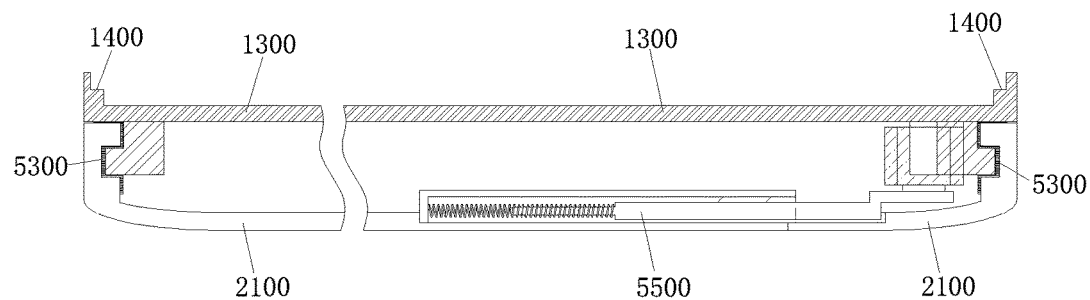
FIG. 6 is an assembly diagram of the screen middle frame and bottom shell of this invention.
Figure 7:
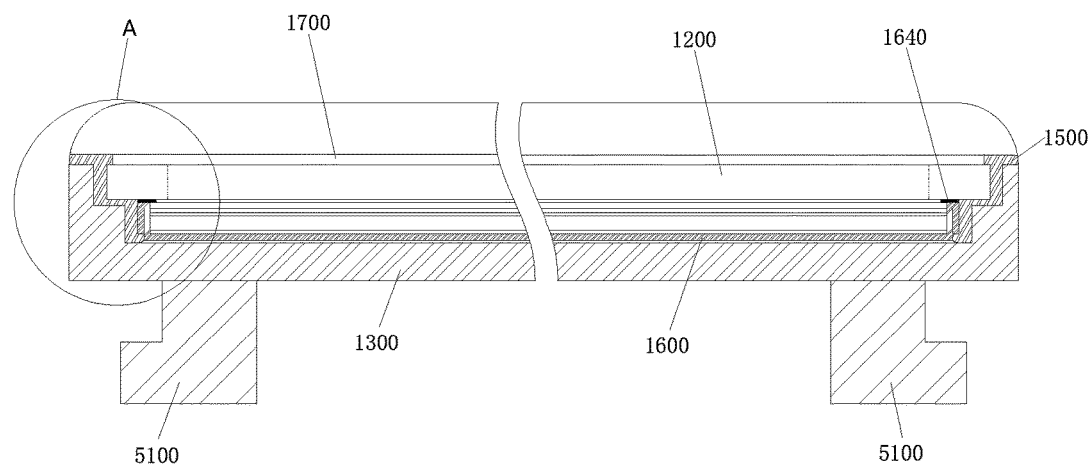
FIG. 7 is the schematic diagram of the display assembly of this invention.

Specifically, as shown in FIGS. 6-7, in order to ensure the stability of the supporting frame of the screen, four edges of the screen middle frame 1300 are arranged around the supporting step 1400. Between the supporting step 1400 and the display screen 1200 is the adhesive layer 1500. The display screen 1200 is the LCD display assembly. As the adhesion layer will display screen 1200 and the screen middle frame 1300 are close adhesive with adhesive layer 1500, ensuring the firmness of the display screen 1200. Of course, in other cases, it is also possible to set up the supporting steps 1400 on the edge of the screen on the opposite sides of the screen middle frame 1300 then it can realize the function of supporting the display screen 1200. The cover lens 1100 is set around the display screen 1200 and is adhered with it by using the OCA (Optically Clear Adhesive) transparent glue layer 1700. Meanwhile, in order to ensure that the overall display effect the backlight module 1600 is arranged at the bottom of the display screen 1200 and middle frame between of the screen 1300. Since the backlight module 1600 minimizes the size of the border and reduce the light loss as well, enhancing the whole display effect. Moreover, the width of the cover lens 1100, the display screen 1200 and the backlight module 1600 is narrowed one by one. While the screen middle frame 1300 is provided with a trapezoid supporting step 1400, which makes up for the strength loss due to the narrowing of the edge. During assembling, the cover lens 1100, the display screen 1200, the screen middle frame 1300 are sequentially adhered tightly in stepped structure. The screen middle frame 1300 is corresponding to the steps of the display screen 1200 in concave-convex, then glue between the two points and fix the display screen 1200 in the screen middle frame 1300. The cover lens 1100 is made on the periphery of the display screen 1200. The range that the bottom of the cover lens 1100 and the display screen 1200 shares is adhered with the OCA glue and the transparency is good. While out of the range of the cover lens 1100 and the display screen 1200, the bottom of the cover lens is printed black to shield the light leakage of the display screen 1200, edge of the cover lens 1100 and the viscose at the top of the narrow side of the screen middle frame.

Preferably, in this invention the electrically conductive pieces for connecting the mainboard and the display screen 1200 are a soft ribbon cable. The soft ribbon cable has good bending property and can bear several times stretching or bending, making sure of the reliability of the electrical connection between the mainboard and the display screen 1200.

Specifically, as shown from FIGS. 2-7, the backlight module 1600 comprises the iron frame 1610, backlight membrane material 1620 and the light guide plate 1630. The light guide plate 1630 and backlight membrane material 1620 are successively stacked in the iron frame 1610. The iron frame 1610 is made of ultra-thin mental material and was bend. In addition, in order to improve the structural strength of iron frame 1610, the four sides of it have been bent to form reinforcing edges 1650 that is bent with unilateral edge, thus not only enhancing the structural strength but also reducing the overall thickness of the backlight module and meet the strength requirements of the iron frame 1610 that the ultra-thin backlight module 1600 asked for. The light guide plate 1610 set in the iron frame 1630 is capable of transmitting light. By putting the light guide plate 1630 and the backlight membrane material 1620 orderly in the iron frame 1610 the light passes through the conduction of the light guide plate 1630. With the diffusion and enhancement of the backlight membrane material 1620, the illumination area and backlight intensity are increased. Furthermore, a reflective layer that is made by spraying or plating is arranged on the four side of the iron frame 1610 (not marked in the figure). It can reflect the light back into the guide plate 1630, reducing the usage of plastic frame and the width of the backlight border, minimizing the light loss in order to improve the brightness of the backlight. At the same time, a narrow shielding glue layer 1640 is made at the top surface of the 1610 iron frame and in the backlight membrane material 1620 as it can block light leakage of the edge. The shielding glue layer 1640 is a kind of thin black shading glue, which can not only fix the light guide plate 1630 and backlight membrane 1620 in the iron frame 1610 but also can adhere the display 1200 set on the display backlight 1620. Moreover, the black shading glue replaces the traditional black shading tape, greatly reducing the width of backlight edge of the display screen 1200.

Figure 8:
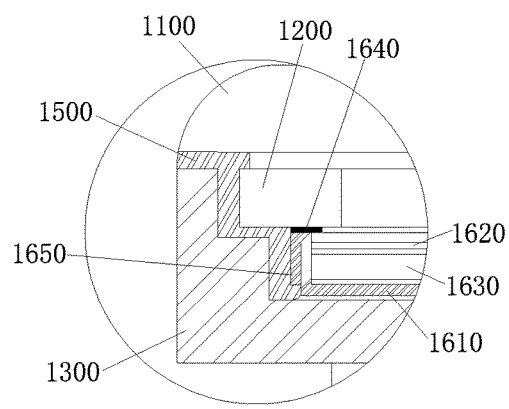
FIG. 8 is the partial enlarged image of the certain location A showed in FIG. 7.
Figure 9:
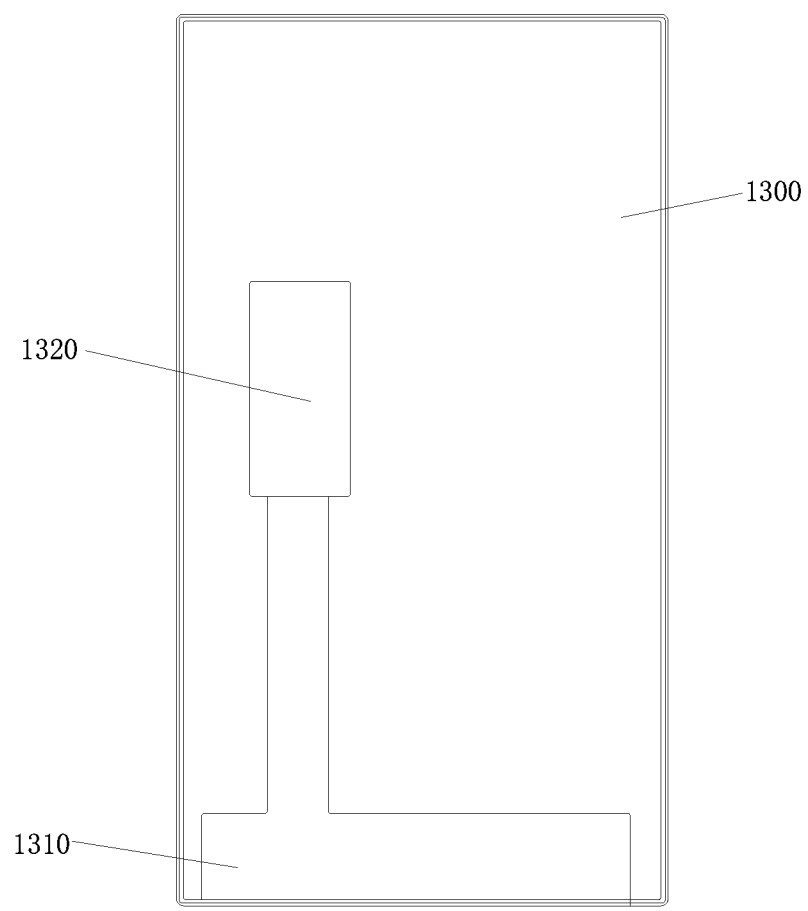
FIG. 9 is a frontal diagram of the screen middle frame of this invention.
Figure 10:
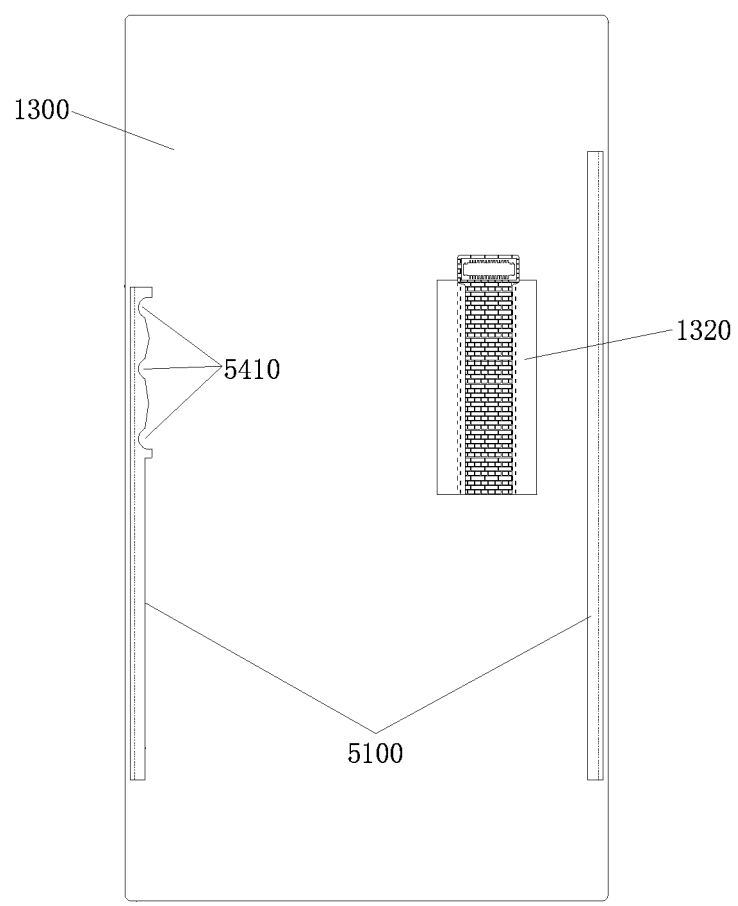
FIG. 10 is a schematic diagram of the back of the middle frame of this invention.

Specifically, as shown from FIGS. 7-9, the shape of the side of the screen middle frame 1300 that hold the bottom of the display screen 1200 screen is flat. The keep-space 1310 that is used to hold electrically conductive pieces 1200 is set at the reflexing place of electrically conductive pieces of the display screen 1200. When assembling, the electrically conductive pieces will be put inside the keep-space 1310 to avoid the display screen 1200 being hunched up by the electrically conductive pieces. In case of long time friction that will scrape the back of the display screen 1200, affecting the display effect. At the same time, the bottom of the screen 1300 is also provided with a vacant hole 1320 for connecting the electrically conductive pieces with the mainboard. After fixing the display screen 1200 smoothly on the screen middle frame 1300, electrically conductive pieces are connected to the mainboard by vacant hole 1320. Moreover, the curved conductive roll is reserved in the vacant hole 1320 to ensure that when user slides the display screen 1200, it can have a conductive piece that is long enough for expansion in order to make sure of the reliability of electrical connection.

Specifically, as shown from FIGS. 6-13, the sliding structure can be an existing spring mechanism and the display assembly 1000 can be slide under the guiding and limiting functions of the spring mechanism. What's more, the slide structure rail can be the chute. In this invention, the sliding structure contains a slide rail 5100 relatively arranged on the back side of the screen middle frame 1300 and a chute 5200 corresponding to the sides of the bottom shell 2100. And the slide rail 5100 is set in the chute 5200. Thus, the sliding connection between the component of the display screen 1200 and the bottom shell assembly 2000 is made by the occlusion between the slide rail 5100 and the sliding chute 5200. To ensure the strength of the structure, the slide rail 5100 and the slide chute 5200 can be made of metal material, and of course, they can also be made from plastic materials that meet the requirements of strength. In this phone, the sliding rail 5100 is directly made on the side of the screen middle frame 1300 and the sliding chute 5200 is arranged on the side of the bottom shell 2100. Then the sliding rail 5100 and the sliding chute 5200 interlocks, making the sliding rail 5100 slide up and down in the sliding chute 5200, which differs from the traditional way that need to set the slip sheet up and down. Therefore, the overall thickness of the mobile phone is reduced and the capacity between the screen middle frame 1300 and the bottom shell is increased, which spare more space to place the mainboard (such as mobile phone mainboard, camera, battery and electro acoustic components).

Furthermore, as shown from FIGS. 2-6, in order to avoid making noise between the slide rail 5100 and sliding chute 5200 a rubber pad 5300 is set in the sliding chute 5200 so that it ensures the smoothness of sliding and eliminates noise when it is skidding and scraping.

Specifically, as shown from FIGS. 6-13, in this invention, to stabilize the sliding position of the display assembly 1000 the positioning assembly (not shown in the figure) is also comprised in the sliding structure to show the position. The positioning assembly consist of three positioning chutes 5410 set on the slide rail 5100 and the pulley component 5500 for blocking the sliding. According to the specific design requirements, only one of the positioning chute 5410 that set on any of the two slide rail 5100 can just meet the use requirements. Of course, in other cases, the positioning chute 5410 can also be provided on both of the two slide rails 5100. The pulley component 5500 contains a pulley arm 5510, pulley 5520 and the fixed shell 5530 of the pulley. Pulley rod 5510 is arranged on the pulley rod is fixed inside the shell 5530. A spring 5540 is set between the other end of pulley arm 5510 5530 and the side walls of the fixed shell of the pulley arm. And the sliding block 5520 of the pulley is made in the positioning chute 5410. In this way, the way of the extent of the vertical slide rail 5100 of the pulley component 5500 is arranged on the bottom shell 2100. When it is closed, the pulley 5520 is in in the middle of the positioning chute 5410. While sliding, user slides the display assembly 1000 upwards, the pulley 5520 slides along in the rail and squeezes the spring 5540. With the elastic force until it blocks into the first positioning chute 5410, stabilizing the position of the pulley. (In this phone, from the top to the bottom, three positioning chutes 5410 are respectively defined as the first, second and third). Similarly, when pushing the display assembly 1000 downwards, the pulley 5520 slides along the slide rail 5100 with elastic force it blocks into the third positioning chute 5410 and then stabilizing the location. As the structure of the positioning assembly is simple and has good performance, making sure of its reliability when using.

Specifically, the fixed shell of the pulley arm 5530 can be fixed in the bottom shell of 2100 with screw. While in this case the side of fixed shell of the pulley arm 5530 is bent to form the clipping edge 5550 and the bottom shell 2100 is provided with a fixing chute 6000 whose crossed section is trapezoidal. When installed, by pressing the fixed shell 5530 of the pulley arm, the clipping edge 5550 will be set on the fixing chute 6000. Thus the whole fixed groove pulley component 5500 is fixed on the trapezoidal fixing chute 6000, maximally minimizing the bottom space occupied by the pulley component 5500.

Figure 12:
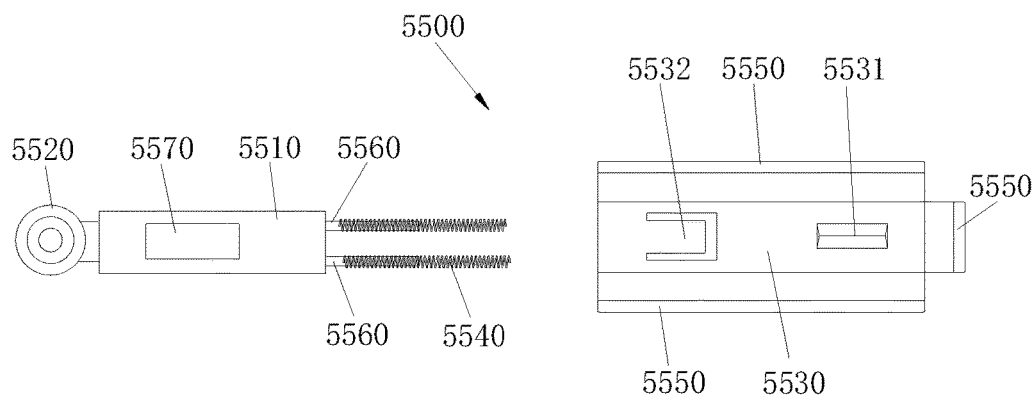
FIG. 12 is a schematic diagram of the structure of the pulley component of this invention.
Figure 13:
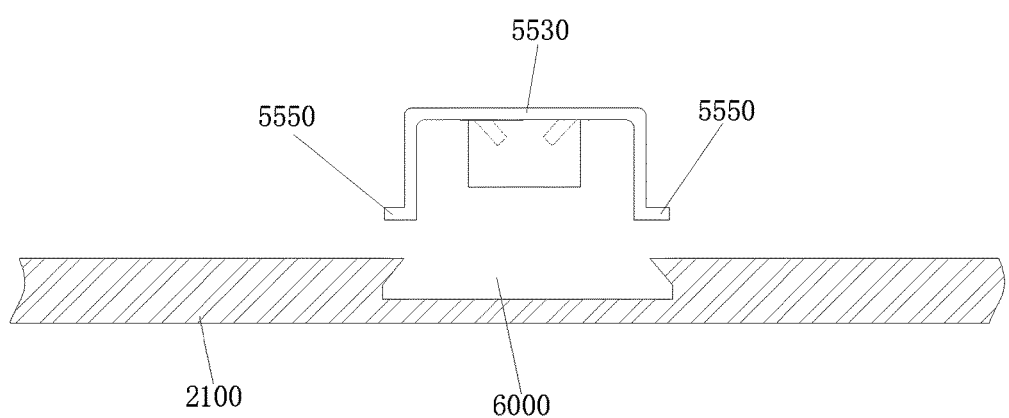
FIG. 13 is an assembly diagram of the fixed shell of the pulley rod and the bottom shell of this invention.

Specifically, as shown in FIG. 12, to further ensure the reliability of the positioning assembly, the other end of the pulley arm 5510 is provided with two spring inserting rods 5560 and the spring 5540 is inserted in the spring inserting rods 5560. Meanwhile, the spring lock 5531 is made on the fixing shell of the pulley arm 5530, making the spring lock lies between the two springs 5540. Therefore, the location of the spring 5540 can be fixed, avoiding mutual interference by each other.

Further, as shown in FIG. 12, a pulley rod lock piece 5532 is also arranged on the fixing shell of pulley arm 5530 and a keyhole 5570 is put on the pulley arm 5510. The pulley lock plate 5532 is made in the keyhole 5570 as well. Thus, the pulley arm 5510 can be reliably fixed in the fixing shell of the pulley arm 5530, avoiding the sloshing when using and ensuring the reliability of the positioning function.

Figure 11:
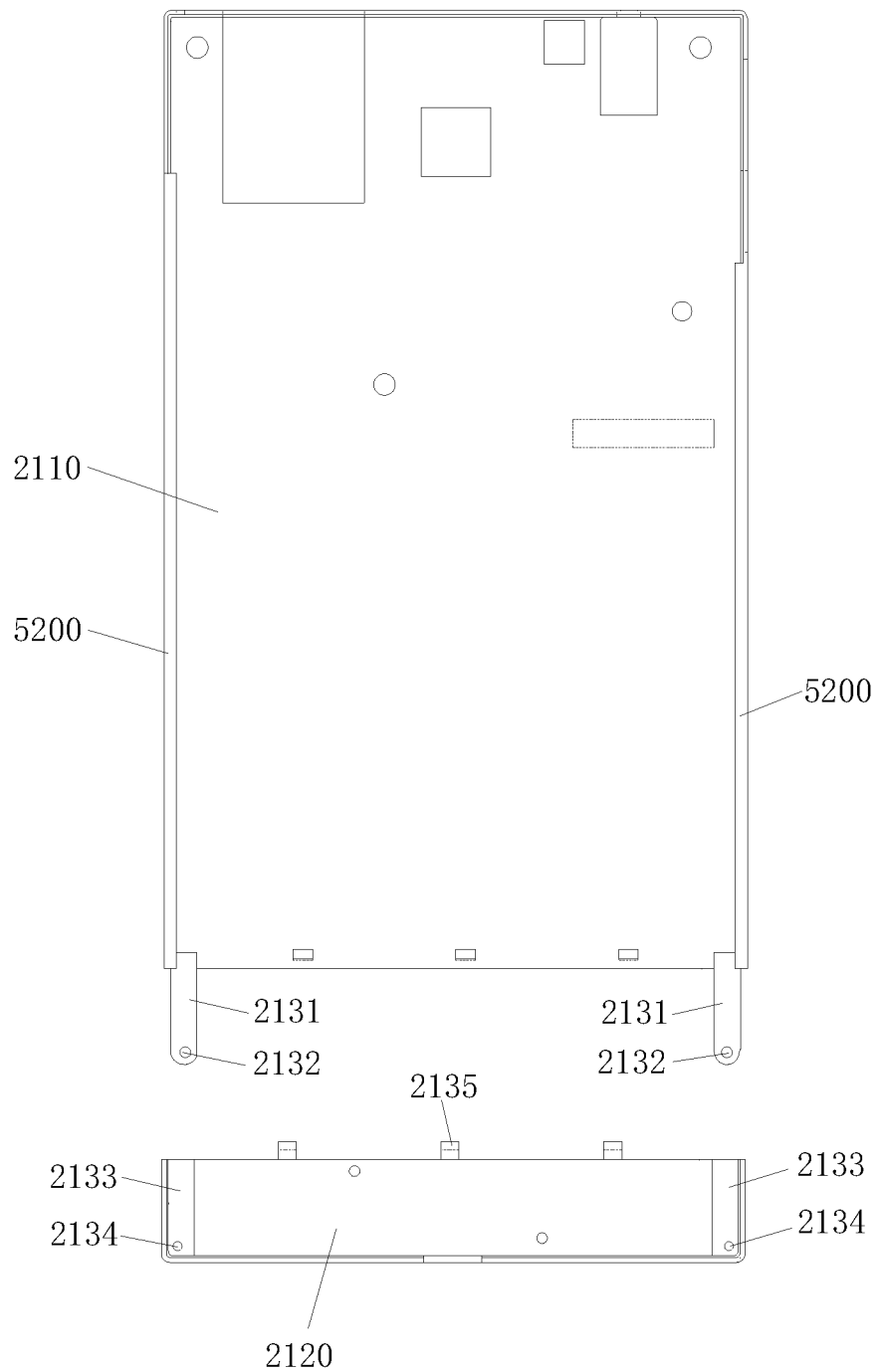
FIG. 11 is an assembly diagram of the main shell and the auxiliary shell of this invention.

Specifically, as shown in FIG. 11, in the present invention, the bottom shell 2100 comprises the main cover that is made of metal materials and the auxiliary shell 2120 which is made of plastic. Certainly, both of them can be made of metal or plastic. The two sliding chute 5200 is relatively set on both sides of the main shell 2110. Through the separate setting, the sliding rail 5100 is inserted into the sliding chute 5200 and the position of the auxiliary shell 2120 avoids the derailment caused by the excessive sliding. The bottom of the main shell 2110 is also provided with a rear camera hanging fixation and a hanging hole at the lower end. In order to make the main shell 2110 and the auxiliary shell 2120 connected a connecting structure is provided with between them. The connecting structure is set relatively on the two fixing handle 2131 of the lower end of the main shell 2110. The screw hole 2132 is made on the two fixing handle 2131 and correspondingly the trapezoidal connection slot is made on the auxiliary shell 2120. What's more, the connecting groove 2134 is arranged in the connecting hole 2134. In the installation, the fixing handle 2131 will be inserted into the connecting groove 2133. The screw holes 2132 will be targeted at the connecting hole 2134 and screws in. At the same time, a hanging buckle 2135 that is designed on the main shell 2110 is also available on the auxiliary shell 2120 which ensures the fixed stability of the two further.

In this invention we offer a fameless ultra-thin mobile phone. As the supporting step 1400 set around the screen middle frame and the display screen 1200 made on the supporting step, it not only ensures the stability of the display screen 1200 and achieve the goal of borderless. Furthermore, by superimposing the display assembly 1000 and the bottom shell assembly 2000, the call receiving assembly and control assembly can be hidden, improving the overall beauty of the mobile phone. As the sliding structure is made in the bottom shell 2100 and only spare the sliding space of the pulley 5520 providing more place for the bottom shell 2100 to install other components. The mainboard installed in the bottom shell 2100 comprise the integrated main-control chip installed in the main shell 2110, power management circuit, storage circuit, baseband circuit, front camera, receiver, proximity sensor, function button and so on. Furthermore, the trumpet and the receiver are designed on the auxiliary shell 2120. The antenna is on the side plate that connects with the mainboard through the flexible circuit board (FPC). Normally the sub plate is hidden under the display screen 1200, when you want to use the front camera or answer the call you can push the display screen 1200 downwards and then the front camera, receiver and a proximity sensor will be shown. If the display screen 1200 is pushed up the functional keys are exposed so it is of great convenience.

In this invention we offer a borderless ultra-thin slide phone and provide the using guidance as well. The instruction comprises sliding the phone upwards and downwards. When the phone call is coming, user can slides down the display assembly 1000, making the call receiving assembly on the bottom shell 2100 shown and then answering, which is extremely convenient. While it is in a dormant state, the user can slide down the display assembly 1000 and directly entry to the dial-up interface or into the camera interface, which he can choose according to their own needs; when user is in need of selecting different functions, sliding the display assembly 1000 will directly access to main control interface of mobile phone. At that time, user can touch the display screen 1200 or press functional keys on the bottom shell 2100 to select functions according to their own habits. With various methods it can meet different needs.

The above mentioned is only an exact example of the invention but is not used to limit it. Any modification, equal replacement or improvement within the spirit and principles of this invention should be comprised in the protection scope of the invention.

The invention claimed is:

1. A borderless ultra-thin slide phone, comprising a display assembly and a bottom shell assembly that are stacked together; wherein the display assembly comprises a cover lens, a display screen and a screen middle frame; the screen middle frame is provided thereon with a supporting step, and the display screen is arranged on the supporting step; the bottom shell assembly comprises a bottom shell, a battery and a mainboard, wherein the battery and the mainboard are arranged in the bottom shell; a sliding structure is arranged between the screen middle frame and the bottom shell; a call receiving assembly and a control assembly that are electrically connected with the mainboard are arranged at an upper end and a lower end of the bottom shell, the control assembly comprises functional keys configured for function selections; the mainboard is connected with the display screen by electrically conductive pieces; the display assembly can simultaneously block the call receiving assembly and the control assembly, and the control assembly or the call receiving assembly exposes when the display assembly moves upward or downward relative to the bottom shell assembly.

2. The borderless ultra-thin slide phone of claim 1, wherein the call receiving assembly comprises a front camera, a receiver, and a proximity sensor set on the upper end of the bottom shell.

3. A method for using the borderless ultra-thin slide phone of claim 2, wherein the method comprises: sliding the display assembly upwards and downwards; when a call is received, a user can slide down the display assembly to answer the call; in a dormant state, when sliding down the display assembly the user can directly choose to dial or use the camera in an operation interface; when the user wants to select mobile phone functions, sliding up the display assembly enters a main interface of the mobile phone to control function selection.

4. The borderless ultra-thin slide phone of claim 1, wherein the supporting step is set around edges of the screen middle frame.

5. The borderless ultra-thin slide phone of claim 1, wherein the supporting step is arranged at edges of two opposite sides of the screen middle frame; a side of the bottom shell is also provided with an entity control key, and the control key is three-way operational and configured to switch on/off of the phone or adjust volume of the phone.

6. The borderless ultra-thin slide phone of claim 1, wherein an adhesion layer is arranged between the supporting step and the display screen, and wherein the cover lens covers on a periphery of the screen middle frame and is adhered to the screen middle frame.

7. The borderless ultra-thin slide phone of claim 1, wherein a backlight module lies between the display screen and the bottom of the middle screen frame.

8. The borderless ultra-thin slide phone of claim 7, wherein the backlight module comprise an iron frame, a backlight membrane, and a light guide plate; the light guide plate and the backlight membrane material are respectively arranged inside the iron frame; a top surface of the iron frame and the backlight membrane are covered with shading layer and four sides of the iron frame are bent to form reinforcing edges.

9. The borderless ultra-thin slide phone of claim 8, wherein side edges of the iron frame are provided with a reflecting layer.

10. The borderless ultra-thin slide phone of claim 1, wherein the bottom of the screen middle frame is provided with a hollow slot for accommodating the electrically conductive pieces and a hollow hole for leading electrically conductive pieces out to piercing through the mainboard.

11. The borderless ultra-thin slide phone of claim 1, wherein the sliding structure comprises a slide rail set on two opposite sides of a back of the screen middle frame and a sliding chute correspondingly arranged on two opposite sides of a front of the bottom shell; and the slide rail is slidably arranged in the sliding chute.

12. The borderless ultra-thin slide phone of claim 11, wherein the sliding structure also comprises a positioning assembly configured to fix a position of the display assembly; the positioning assembly comprises three positioning grooves arranged on the slide rail and a pulley assembly for sliding; the pulley components comprises: a pulley rod, a pulley, and a pulley rod fixing shell; the pulley is slidably arranged at one end of the pulley rod, the pulley rod is arranged inside the pulley rod fixing shell, a spring is set between the other end of the pulley rod and a side wall of the pulley rod fixing shell; and the pulley rod is slidably limited inside the positioning grooves.

13. The borderless ultra-thin slide phone of claim 12, wherein a lateral side of the pulley rod fixing shell is bent to form a clipping edge, the bottom shell is provided with a fixing groove, and the clipping edge is fixed in the fixing groove.

14. The borderless ultra-thin slide phone of claim 12, wherein an end of the other end of the pulley rod is provided with two spring rods; two springs are inserted in the spring rods; a spring lock plate is arranged on the pulley rod fixing shell and the spring lock plate is locked between the two springs.

15. The borderless ultra-thin slide phone of claim 14, wherein the pulley rod fixing shell is also provided with a pulley rod lock plate; a keyhole is arranged on the pulley rod, in which the pulley rod lock plate is stuck in the keyhole.

16. The borderless ultra-thin slide phone of claim 11, wherein the bottom shell comprises a main shell and a sub shell, a connection structure is arranged between the main shell and the sub shell, and two sliding chutes are oppositely arranged on two sides of the main shell.

17. A borderless ultra-thin slide phone, comprising a display assembly and a bottom shell assembly that are stacked together;
   the display assembly comprising a cover lens, a display screen and a screen middle frame, wherein the cover lens and the display screen are sequentially arranged on the screen middle frame, and the cover lens covers the display screen; and
   the bottom shell assembly comprising a bottom shell, a battery and a mainboard, wherein the battery and the mainboard are arranged in the bottom shell;
   wherein
   the mainboard is in electrical connection with the display screen;
   a sliding structure is arranged between the screen middle frame and the bottom shell; and
   the borderless ultra-thin slide phone further comprises a call receiving assembly arranged on an upper end of the bottom shell.

18. The borderless ultra-thin slide phone of claim 17, wherein the call receiving assembly comprises at least one of a front camera, a receiver, and a proximity sensor, which are set on a front upper end of the bottom shell.

19. The borderless ultra-thin slide phone of claim 17, wherein the sliding structure is configured to expose the call receiving assembly when the display assembly moves downward relative to the bottom shell assembly.

20. The borderless ultra-thin slide phone of claim 17, wherein the screen middle frame is provided thereon with a supporting step, and the display screen is arranged on the supporting step.

* * * * *